United States Patent [19]

Fink et al.

[11] Patent Number: 4,758,754
[45] Date of Patent: Jul. 19, 1988

[54] PORTABLE ELECTRIC TOOL WITH VARIABLE TORQUE

[75] Inventors: Manfred Fink, Eberstadt; Klaus M. Junginger; Wolfgang Schreiber, both of Stuttgart, all of Fed. Rep. of Germany

[73] Assignee: C. & E. Fein GmbH & Co., Stuttgart, Fed. Rep. of Germany

[21] Appl. No.: 8,934

[22] Filed: Jan. 30, 1987

[30] Foreign Application Priority Data

Apr. 1, 1986 [DE] Fed. Rep. of Germany ....... 3610820

[51] Int. Cl.⁴ .................. H02K 11/00; H01H 3/02
[52] U.S. Cl. .................... 310/78; 192/0.034; 192/56 R; 310/50; 310/68 B
[58] Field of Search ............ 74/412 TA; 192/0.034, 192/56 C, 150; 310/47, 50, 83, 68 B; 318/434

[56] References Cited

U.S. PATENT DOCUMENTS 3,162,250 12/1964 Sindelar ....................... 192/150
4,063,600 12/1977 Krzes .......................... 310/50
4,208,555 6/1980 Ikeda et al. .................. 192/150

FOREIGN PATENT DOCUMENTS 2731090 9/1983 Fed. Rep. of Germany ........ 310/78

OTHER PUBLICATIONS

"Wie Funktioniert Das?", Bibliographisches Inst., Mannheim, 1963, pp. 612, 613.

Primary Examiner—Patrick R. Salce
Assistant Examiner—D. L. Rebsch
Attorney, Agent, or Firm—Max Fogiel

[57] ABSTRACT

In motor-operated machines, especially portable electric tools, it is essential to prevent an impermissibly high torque on the driveshaft or operating spindle. This is attained by means of a torque-disengagement mechanism. An especially elegant, compact, precisely responsive torque-disengagement mechanism is attained by mounting one of the two bearings for a driveshaft in the machine housing or similar structure in such a way that it can move across the longitudinal axis or radially far enough to initiate a switching procedure. The bearing is secured in an initial position by means of an opposing force. The position represents both the zero position for the switching procedure and the correct position of the axis of the driveshaft during operation. If the machine includes a means of varying the torque, the power of the opposing force can be adjusted and maintained either continuously or discontinuously. The opposing force is generated in a practical way by a spring, specifically either by a compact but still powrful stack of cup springs or by a torque rod, both requiring little space.

32 Claims, 6 Drawing Sheets

PORTABLE ELECTRIC TOOL WITH VARIABLE TORQUE

BACKGROUND OF THE INVENTION

The present invention relates to a motor-operated machine, especially a portable electric tool, with a means of varying the torque, with a torque-disengagement mechanism, an operating spindle, and a driveshaft with at least one interposed pair of wheels, preferably cogwheels. The function of the means of varying the torque is to establish a prescribed torque in the operating spindle. If a load that exceeds the established torque is applied to the operating spindle, through a bit that communicates with it for example, the torque-disengagement mechanism will disengage the motor. A known machine of this type is disengged by means of a clutch. This prevents excessive driving for example if the electric tool is acting as a screwdriver, and decreases the jolt or opposing force upon termination of the driving action.

The necessity of interposing a torque clutch between the transmission and main shaft, which makes the machine, especially a portable electric tool, a lot longer, is considered a drawback.

Mounting wire strain gauges on at least one of the driveshafts to measure the rotation of the shaft occasioned by the opposing torque has been proposed. Strain gauges are, however, appropriate for testing purposes and not for use in mass-produced articles.

SUMMARY OF THE INVENTION

The object of the present invention is to improve a motor-operated machine, especially a portable electric tool, with a means of varying the torque, of the type initially described to the extent that the torque will reliably be disengaged when it reaches a prescribed level, at relatively little expense and with as little increase in the size of the machine as possible.

This object is attained in accordance with the invention in that the transversely moving driveshaft bearing is maintained in an initial or zero position by an opposing force. As long as the opposing torque that engages at that point remains below a level that corresponds to the opposing force, the driveshaft will persist in the initial position in relation to the lateral deviation of its moving bearing. Once the opposing torque increases impermissibly, however, a force in opposition to the opposing force will occur in the moving bearing, will exceed the level of the opposing force, and will accordingly allow the driveshaft bearing to deviate to the side. Since there is a motor-switching component within the range of motion of the bearing or of a component of the machine that is rigidly connected to the bearing, the transverse motion of the driveshaft bearing will simultaneously occasion a switching procedure in the sense of turning off the motor. This action will occur whether or not the bearing, as it moves to the side, deactivates a switching component that is active in its normal state or activates a switching element that is inactive in its normal state. The only essential is that the switching procedure interrupts the supply of power to the motor. The characteristic in accordance with which a motor-switching component is positioned within the range of motion of the bearing is accordingly to be understood in its widest sense, that the bearing can operate in conjunction with the switching component either as it moves out or when it moves back in the sense of a switching procedure.

The moving bearing must not on the other hand require too much space by being any larger than the conventional bearing of a driveshaft that does not move to the side or that does so only within the scope of normal play. The component that switches off the motor can be very small, as can the switch that includes the component, to allow ready accommodation within the range of motion of the bearing. Thus, the motor-operated machine will optimally comply with all the aforesaid demands.

The strength of the opposing force can be varied in one especially preferred embodiment of the machine with a means of varying the torque. Thus, if the means of varying the strength of the force is continuous, a large number of different torques can be established. The method and means of varying the level of the opposing force depend on the way it is generated. If the opposing force is generated by means of a spring, the force can easily be varied by tensioning the spring to a greater or lesser extent, especially continuously. This mechanism for varying the opposing force can be very small. It should also be remarked at this point that the bearing can move transversely approximately 0.5 to 1.0 mm and does not need to move farther than 2.00 mm. The transversely moving bearing is positioned in an appropriate accommodation in the machine housing or in a similar structure dimensioned and shaped to reliably establish two limiting positions, an initial position and the position in which the motor is turned off.

In one development of the invention along these lines, the moving driveshaft bearing is accommodated in a bore or groove in the machine housing or similar structure, whereby the diameter or width of the bore or groove exceeds the width of the bearing by the maximum distance moved, by between 0.5 and 2 mm for example The force-generating spring in two preferred embodiments of the invention can consist of a stack of cup springs or of a torque rod. It is tensioned in the first case bymeans of an approximately straight-line motion and in the second case by a rotation. The mechanism for increasing and decreasing the spring tension must then be appropriately designed.

Preferred embodiments of the invention will hereinafter be described with reference to the appended drawings. It is to be understood, however, that these are merely by way of example and that the scope of the protection sought for the invention is defined exclusively in the claims.

DETAILED DESCRIPTION OF THE PREFERRED EMBODIMENTS

The Figures illustrate two preferred embodiments of a portable electric tool, preferably an electric screwdriver or sander. The first embodiment is shown in FIGS. 1–5 and the second in FIGS. 6–8. Those parts of the embodiments which are identical are referred to by the same reference numerals and described together in the following.

A bit, a screwdriver blade or sanding bit for example, is connected to its operating spindle 1 in such a way that it cannot rotate in relation to the spindle. Work spindle 1 is driven by a motor, an electric motor 2 in the preferred case, through the intermediary of a transmission 3. An essential component of the latter is a pinion 5 that is connected to the shaft 4 of the motor and meshes with the cogwheel 6 of a driveshaft 7. Driveshaft 7 is a transmission shaft that, in addition to cogwheel 6, another pinion 8 is mounted on. At least the length of the section of shaft between the two wheels that faces pinion 8 is in the form of another pinion 9. A sliding cogwheel 10 constantly engages the teeth of pinion 9. Both a first sliding cogwheel 10 and a second sliding cogwheel 11 are mounted on a transmission take-off shaft 12 in such a way that they can both rotate around it and slide along it. Transmission take-off shaft 12 is in one piece with operating spindle 1. At every point along its travel, second sliding cogwheel 11 engages the pinion 8 on driveshaft 7.

The following description refers to a special embodiment of the transmission 3 which is shown in more detail in conjunction with the second embodiment but which is also realized in connection with the first embodiment.

Figure 6:
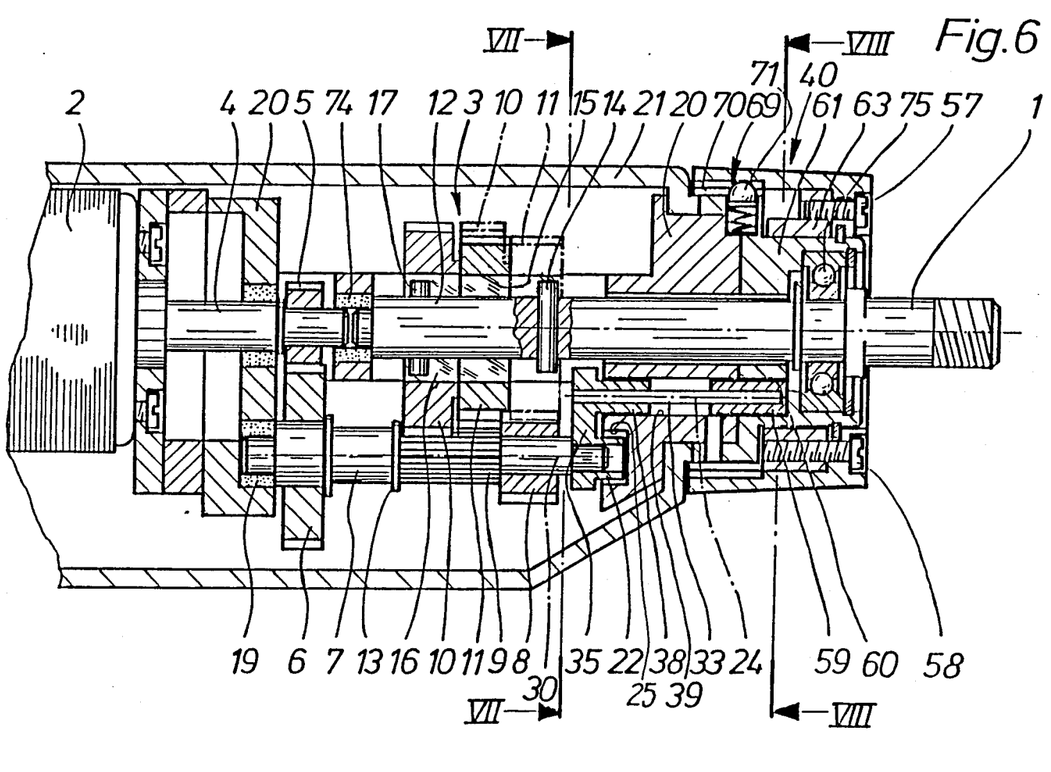
FIG. 6 is a section similar to that in FIG. 1 through the operating spindle and a transmission shaft of another embodiment of the invention.

In the second embodiment illustrated in FIG. 6 a stop ring or collar 13 is mounted on driveshaft 7 and limits the extent that cogwheels 10 and 11 can slide to the left (shown in FIG. 6 by solid lines). The ring or collar 13 in the present embodiment is a snap ring. It will be evident from this FIG. in particular that, when second sliding cogwheel 11 is slid all the way to the left, its right-hand edge will still engage the left-hand edge of pinion 8, meaning that wheels 8 and 11 will still mesh without being involved in torque transmission, since cogwheel 11 is freely rotatable on the transmission take-off shaft 12.

In the dashed-line representation in FIG. 6 sliding cogwheels 10 and 11 are in their extreme right-hand position, in which second sliding cogwheel 11 is locked into connection with operating spindle 1 by a transverse pin 14 that exceeds radially all the way through transmission take-off shaft 12, while first sliding cogwheel 10 is freely rotatable. Transverse pin 14 engages an accommodation 15 in second sliding cogwheel 11 that consists of two longitudinal grooves mutually displaced 180°. An accommodation in the shape of a cross or star is, however, also conceivable and would provide two or more angularly displaced means of coupling. There is another and similar accommodation 16, engaged by another transverse pin 17, on sliding cogwheel 10.

When first sliding cogwheel 10 is in its extreme right-hand position, it engages transverse pin 17 while cogwheel 11 is freely rotatable. Both sliding cogwheels 10 and 11 are displaced along transmission take-off shaft 12 and operating spindle 1 by known means. Since their combined width is somewhat less than the free distance between transverse pins 14 and 17, they can be completely uncoupled from operating spindle 1, with the resulting mid-position on the part of both wheels representing the idling state of the tool.

The bearing 19 that is on the left in FIG. 6 is secured stationary in a machine housing 20, which, as will be evident from the drawing, is not closed off but is accommodated inside another housing 21 that is closed off to protect the components inside it. The right-hand bearing 22 can, in contrast to bearing 19 and in accordance with the invention, move to a prescribed and relatively short distance of approximately 1 mm across the longitudinal axis 30 of driveshaft 7. This motion is approximately perpendicular to the plane of projection of FIGS. 2 and 6 or in an arc around axes 23 (FIGS. 2 and 3) or 24 (FIG. 6).

Figure 1:
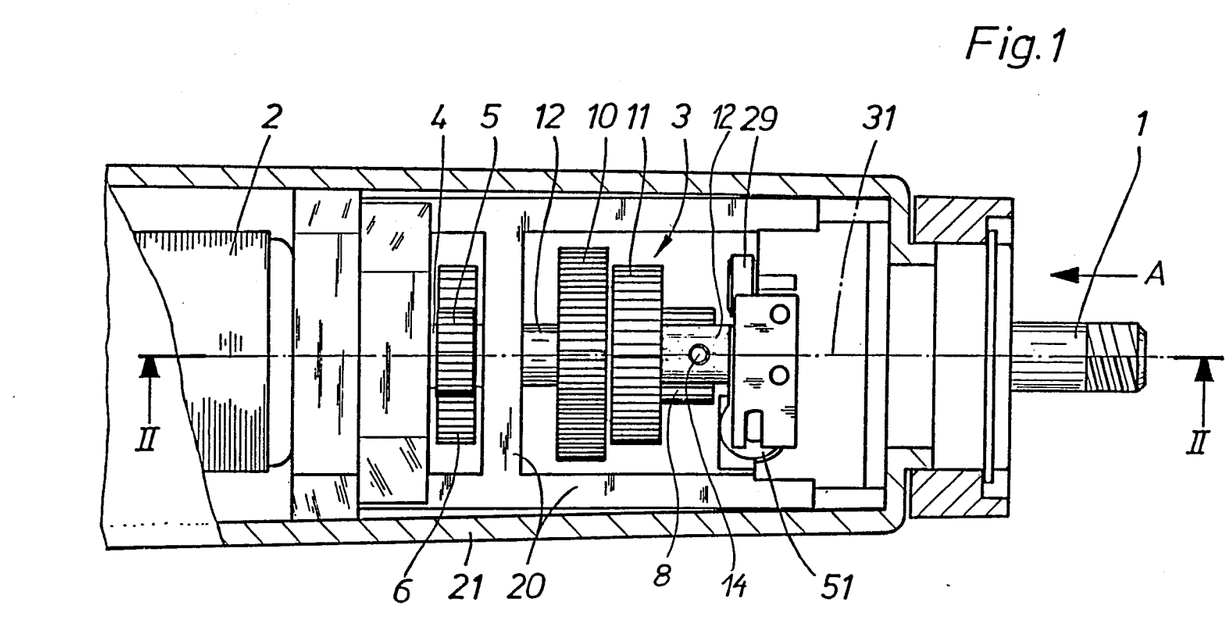
FIG. 1 is a view, partly sectional horizontally, of one embodiment of a motor-operated machine, preferably a portable electric tool, in accordance with the invention.
Figure 2:
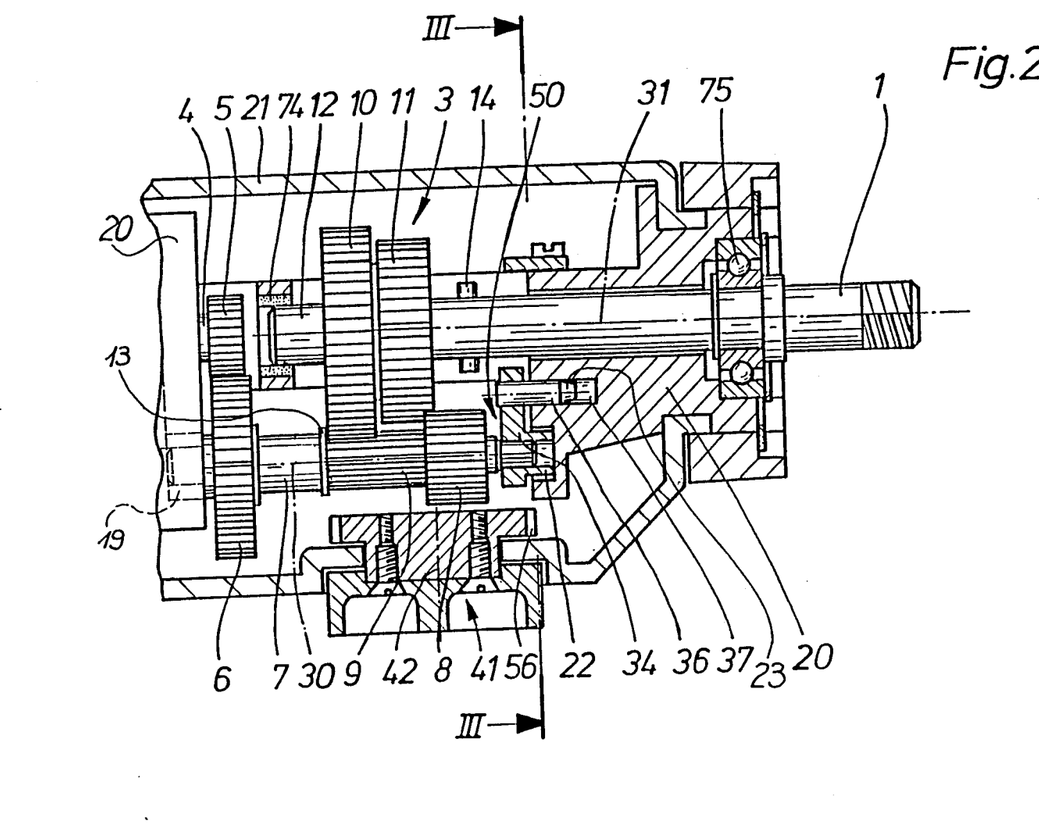
FIG. 2 is a section along the line II—II in FIG. 1.
Figure 3:
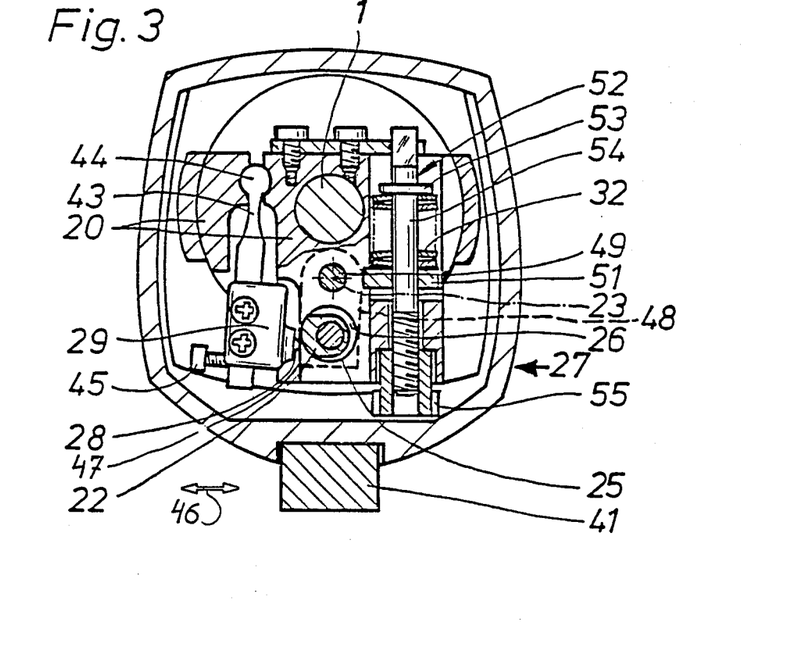
FIG. 3 is a section along the line III—III in FIG. 2.
Figure 4:
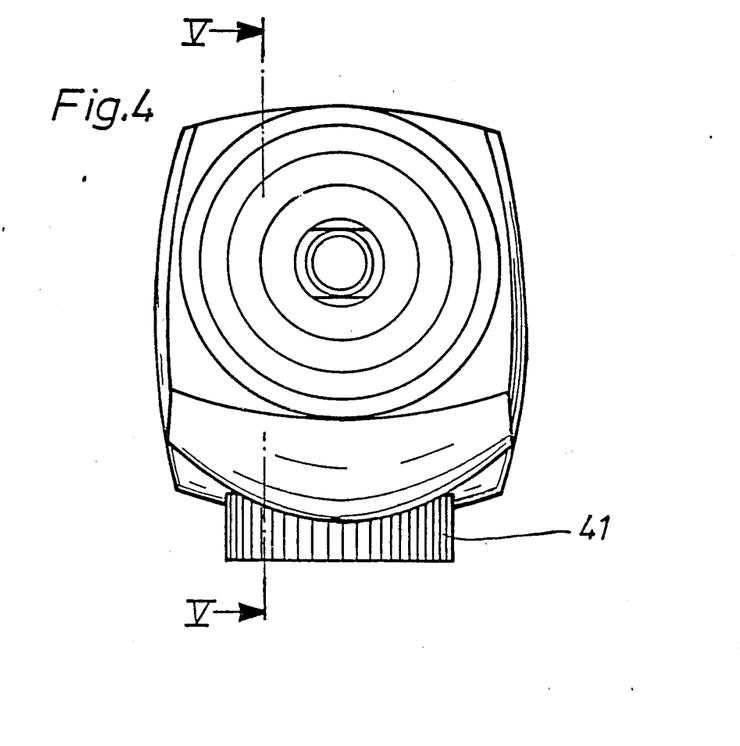
FIG. 4 is a front view along the direction indicated by arrow A of the embodiment illustrateed in FIG. 1.
Figure 5:
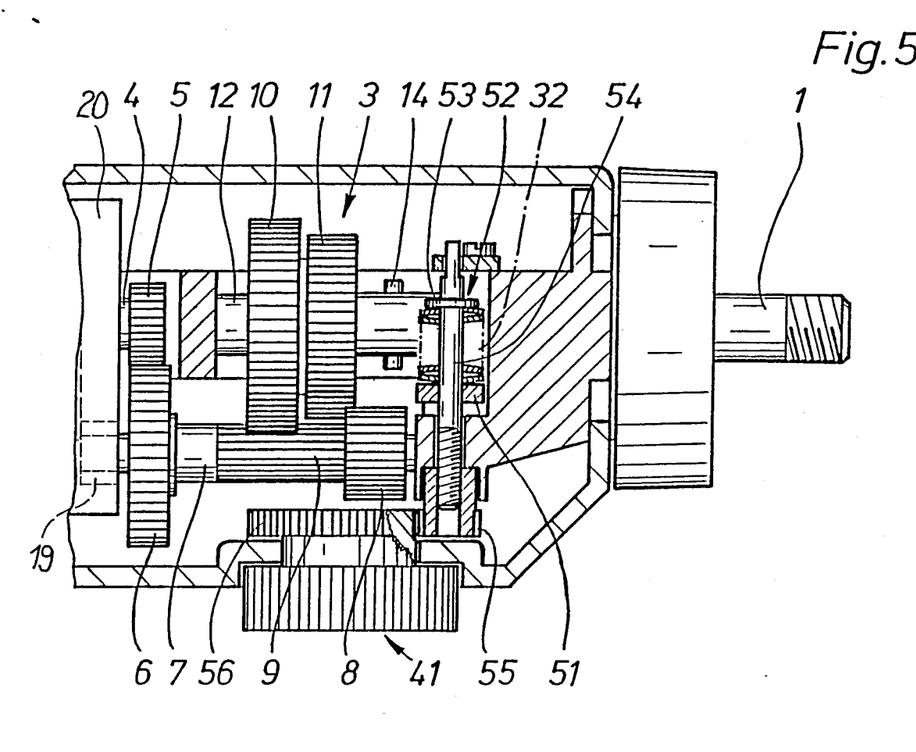
FIG. 5 is a section along line V—V in FIG. 4.
Figure 7:
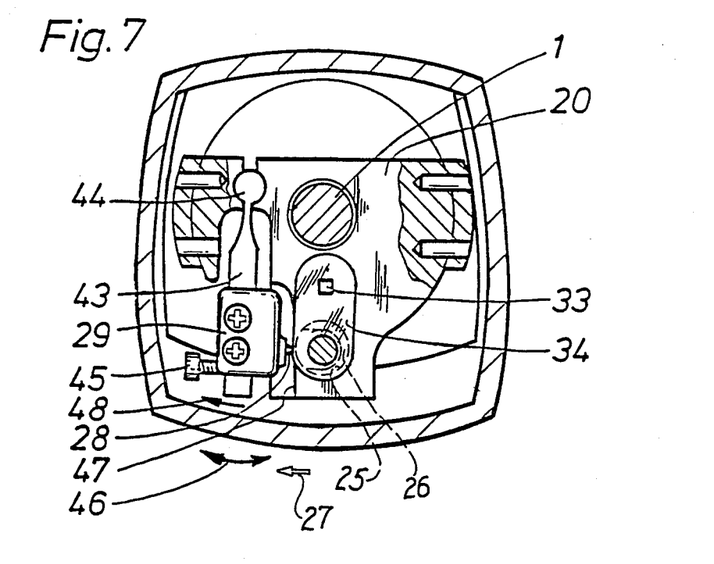
FIG. 7 is a section along the line VII—VII in FIG. 6.

The outer surface of bearing 22, as will be evident from FIGS. 3 and 7, can be described as approximately oval. It engages a bore 25 (FIGS. 3 and 7) in inner housing 20 or a comparable structure. The area of moving bearing 22 that is on the left-hand side in FIG. 3 is curved to at least approximately match the curvature of bore 25. The area of bearing 22 on the right-hand side is at a distance 26 from the right-hand side of bore 25. Distance 26 determines the maximum displacement of the bearing from the illustrated left-hand initial or zero position into the right-hand, disengaged, switch-off position. The bearing is maintained in its initial position, illustrated as on the left in FIGS. 3 and 7, by an opposing force that acts in the direction indicated by arrow 27 in a way that will now be specified.

Within the range of motion of moving bearing 22 or, more precisely, within the range of its motion from the right-hand or turning-off position into the left-hand or initial position there is in accordance with the invention a component 28 for switching electric motor 2. The switching component 28 in the illustrated embodiment is a tappet on an electrical switch 29 that is positioned within the circuit of electric motor 2. When moving bearing 22 is in the initial position, in normal operation, that is, with the axis of driveshaft 7 paralleling the axis 31 of operating spindle 1, the bearing forces the tappet of switch 29 down. Since the switch has operating contacts, they are closed when bearing 22 is in the initial position. When, due to a torque on operating spindle 1 that exceeds the prescribed level, moving bearing 22 deviates to the side against the resistance of opposing force 27, the tappet on switch 29 is released. This leads to opening of the switch's contacts and hence, preferably indirectly, to an interruption in the supply of current to electric motor 2. it is also possible in this way to prevent the motor from turning on again immediately once the excess torque has been removed. Thus, the displaced position of moving bearing 22 corresponds to the turned-off state of electric motor 2.

This machine preferably features a means of varying the torque, meaning that the power of opposing force 27 can be adjusted. The opposing force is generated by means of a spring. In the first embodiment (FIGS. 1–5), the force-generating spring is a stack 32 of cup springs. The second embodiment (FIGS. 6–8) on the other hand has a force-generating spring (FIG. 6) in the form of a resilient torque rod 33. Its axis 24 coincides with the aforementioned axis that moving bearing 22 pivots around.

Moving bearing 22 is secured to a rotating or pivoting bearing lever 34 (FIG. 2) or 35 (FIG. 6). The pivot or axis of rotation consists in the first embodiment of a bolt 36 inserted in a bore 37 in inner housing 20. Its axis coincides with the aforementioned axis 23.

The pivot or axis of rotation in the second embodiment of bearing lever 35 is embodied in a sleeve 38. Sleeve 38 is in one piece with plate-shaped bearing lever 35, and is inserted in a bore 39 in inner housing 20. It accommodates one end, the end on the left in FIG. 6, of resilient torque rod 33 in such a way that the rod cannot rotate in it. The cross-section of torque rod 33 and hence that of the bores that accommodate each end of the rod are in a practical way quadrilateral, and in particular, square. The opposing force 27 generated by spring 32 or 33 acts on bearing lever 34 or 35 and twists it into the initial position.

The adjustment component 41 in the first embodiment (FIGS. 1–5) is in the form of a wheel that is accessible from outside. The axis 42 of adjustment component 41 is perpendicular to axis 31, as will be evident from FIG. 2. Adjsutment component 41 is preferably located on the bottom of the device.

The adjustment component 40 in the second embodiment (FIGS. 6–8) is in the form of a sleeve with an axis that coincides with the axis 31 of operating spindle 1.

Switching components 28 can be adjusted in relation to inner housing or similar component 20. Adjustment is carried out indirectly in both embodiments by displacing electric switch 29, which is secured to a flexible retainer 43, preferably made out of plastic. To increase its flexibility, the cross-section of retainer 43 is reduced to that of a more or less round retaining strip 44 in the vicinity of its point of tension or attachment. An adjustment component 45 allows retainer 43 to be shifted in the direction indicated by double-headed arrow 46 (FIGS. 3,7). Adjustment component 45 is in the form of a setscrew. Its thread engages an inside thread in retainer 43. It extends through retainer 43 with its free end resting against one area 47 (FIGS. 3,7) on inner housing 20. Thus, screwing the screw into the thread in retainer 43 leads for example to rotating it in the direction indicated by arrow 48. This removes switching component 28, the tappet on switch 29, that is, which simultaneously means a removal from moving bearing 22, which is in the initial position. The opposite action results in approaching switching component 28 to bearing lever 34 or to moving bearing 22 as adjustment component 45 is unscrewed in the opposite sense. When, as in the illustrted embodiments, switching component 28 is a tappet on an electric switch 29, the result will be that the switch is supplied, instead of switching component 28 continuing to be approached, once the activating component has been positioned against bearing lever 34. The consequence will be a partial activation or even switching over of the switching mechanism. It will in any case be possible to adjust the switch-over time with adjustment component 45, independent of the particular switchgear employed. It is fully possible to employ a piezoelectric generator, a Hall sensor, or the sensor component of an inductive or capacitative path sensor instead of a switch. The electric switch in both embodiments is moved toward bearing lever 34 in such a way that, with moving bearing 22 in the relation to bore 25 illustrated in FIGS. 3 and 7, the mechanism of electric switch 29 is switched over and hence, due to the existence of the operating contacts, the circuitry of the switch is closed.

In the first embodiment, the axis of stack 32 of cup springs extends, as illustrated in FIG. 3, across, and in particular, perpendicular to the direction that bearing 22 moves in. Thus, the bearing is positioned on one arm 48 of an angled lever 50 that pivots around a bolt 49. Arm 48 is identical with the aforementioned bearing lever 34. The other arm 51 of angled lever 50 is in the shape of a ring. The end of the stack 32 of cup springs that is at the bottom in FIG. 3 rests against arm 51. The end of the stack that is remote from the lever rests against an adjustable pressure-application component 52.

Pressure-application component 52 consists of a supporting plate 53 and of an arbor 54 that extends through stack 32 of cup springs. Its free end is in indirect operating relationship with adjustment component 41. Arbor 54 has a bolt threading that engages a rotating but axially stationary component 55. Since the end of arbor 54 that faces away from rotating component 55 is prevented from rotating, a rotation of component 55 in one direction will lead to eliminating the tension on the stack of springs. Thus, it is possible to vary the pressure of moving bearings 22 against the area of bore 26 that is on the left in FIG. 3 within certain limits. A high level of tension on stack 32 of cup springs will result in a powerful opposing force 27 and will accordingly lead to turning off the electric motor at a compartively high torque. Since rotating component 55 has teeth on the outside, it is in the form of a pinion, and its teeth mesh with those of a cogwheel 56 on adjustment wheel 41, which can be either separate from, or in one piece with wheel 41. Adjustment wheel 41 can in a practical way be connected to the housing with a catch mechanism, allowing the torque level to be reliably varied in steps. This system can be combined with a mark on the adjustment wheel and with a scale on the housing. A scale of this type is also practical when the adjustment is continuous.

The force-genertig spring in the second embodiment (FIGS. 6–8) is, as previously remarked herein, a resilient torque rod 33. One end, the end on the left in FIG. 6, is inserted in such a way that it cannot rotate in a sleeve-shaped extension 38 on bearing lever 35. Its other end is secured in such a way that it cannot rotate in a sleeve-shaped adjustment component 59 that rotates in a bore 60 in a bearing ring 61 connected to inner housing 20. Mounted on bearing ring 61 is a rotating can disk 63 with an adjustment cam 64 (FIG. 8) at its circumference. Since the disk is secured to adjustment component 40 with screws 57 and 58, adjustment cam 64 can be rotated by means of component 40. Screws 57 and 58 extend through curved slot 65, allowing adjustment component 40 to be adjusted in relation to cam disk 63.

Figure 8:
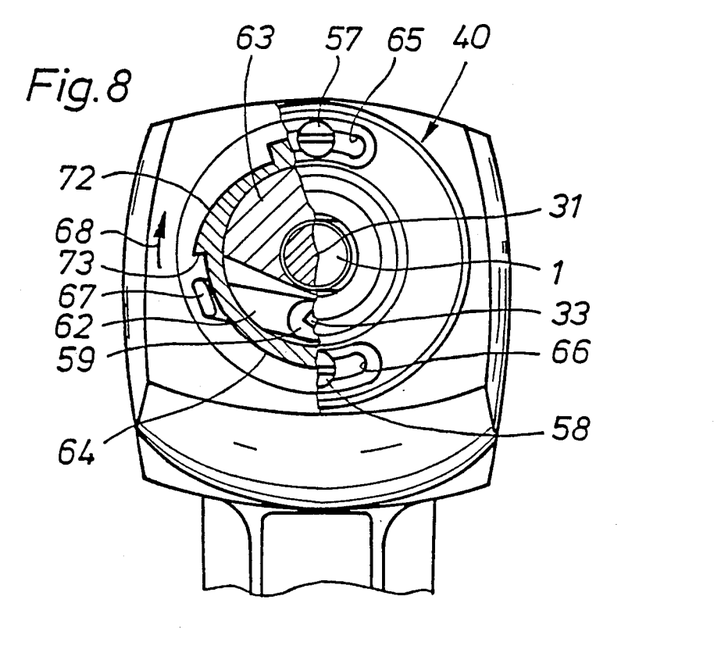
FIG. 8 is a partial section along the line VIII—VIII in FIG. 6.

Mounted on the inner end of sleeve-shaped adjustment component 59 is a radially projecting outrigger arm 62 (FIG. 8). Its bent free end 67 rests outside against adjustment cam 64. Due to the relationship between the various aforementioned components, torque rod 33 will be tensioned, no matter what the relationship between the free end 67 of outrigger arm 62 and adjustment cam 64. This depends as well on the particular cam eccentricity, e.g. the radial distance from the beginning and end from the axis 31 of operating spindle 1.

It will be evident from the foregoing that, due to the increased eccentricity, a rotation of adjustment cam 64 in the direction indicated by arrow 68 will rotate outrigger arm 62 in the opposite direction and hence distort torque rod 33 with constantly increasing tension. This will increase the pressure of moving bearing 22 against the left-hand area of bore 25 (FIG. 7), with both embodiments being identical with respect to this bore and to the shape of the bearing.

To secure the adjusted level of torque or the tension on torque rod 33, a catch mechanism 69 with several positions distributed along the direction of rotation is positioned between inner housing or similar structure 20 and adjustment component 40. Catch mechanism 69 consists of several axially extending grooves 70 distributed especially at equal circumferential intervals around the inside of adjustment component 40 and that can accommodate a catch 71, preferably a spring-loaded ball of the type known from tumblers.

An assembly cam 72, as will be especially evident from FIG. 8, positioned forward of adjustment cam 64 in the direction of rotation. Assembly cam 72 preferably has a short arc length and hence a steep slope. In particular, its inner end is nearer axis 31 than the inner end of adjustment cam 64. Since cam 64 is designed in such a way that torque rod 33 will be tensioned no matter what the position of bent end 67 in relation to adjustment cam 64, assembly would be somewhat complicated without assembly cam 72. When, on the other hand, the inner end of assembly cam 72 is associated with the bend end 67 of outrigger arm 62 when cam disk 63 is positioned on bearing ring 61, there is no problem in assembling the components because it is unnecessary to tension torque rod 33. Once cam disk 63 has been positioned, it is rotated in the direction indicated by arrow 68. As soon as assembly cam 72 has been completely shifted beyond the free end 67 and adjustment cam 64 necessary for operation will have been attained with only a slight amount of tension on torque rod 33. The stepwise transition 73 between assembly cam 72 and adjustment cam 64 simultaneously constitutes one of the two rotation limits. The other, unillustrated, rotation limit similarly constituted.

Due to the particular width of sliding cogwheels 10 and 11 and to the lateral distance between the two transverse pins 14 and 17, the transmission will be in the idling state directly subsequent to a displacement of only half the width of a cogwheel. This also contributes to decreasing the length of the machine and to short switching paths. Transmission take-off shaft 12 or operating spindle 1 is mounted in two bearings 74 and 75. Driveshaft 7, which is in the form of a transmission shaft, can also be kept short, which is an advantage not only in relation to displacing moving bearing 22. Specifically, this will result in comparatively short lever arms during the transmission of force for pinion 9 to sliding cogwheels 10 on the one hand and from pinion 8 to second sliding cogwheel 11 on the other. The lever force needed to disengage the torque directly depends on the position of the sliding cogwheels. The two switching positions of the sliding cogwheels are selected to allow the torque to be prescribed and switched to throughout the total torque range of the machine.

The assembly consisting of electric motor 2 and transmission 3, including operating spindle 1, constitutes in conjunction with "inner" machine housing or similar structure 20, a complete subassembly that can be inserted into outer housing 21. The forces can be transmitted from inner housing 20 to outer housing 21 at precisely defined points.

The invention has been described herein with reference to exemplary embodiments. It will be understood, however, that it is receptable of various modifications, which will offer themselves to those skilled in the art and which are intended to be encompassed within the protection sought for the invention as set forth in the appended claims.

We claim:

1. A motor operated machine with variable torque disengagement, particularly a portable electric tool, comprising
    a motor,
    a drive shaft driven by said motor via gears,
    an operating spindle driven by said drive shaft via gears,
    a first bearing means for said drive shaft arranged so as to be stationary,
    a second bearing means for said drive shaft spaced from said first bearing means and being displaceable transversely to a longitudinal axis of rotation of said drive shaft within a range of motion of an opposing force, said drive shaft being inclinable transversely to its longitudinal axis of rotation from an initial position by displacement of said second bearing means, and
    means for switching off said motor actuatable by inclining said drive shaft as well as displacing said second bearing means out of the initial position.

2. A machine as defined in claim 1, including means for adjusting said opposing force.

3. A machine as defined in claim 1, including spring means for generating said opposing force.

4. A machine as defined in claim 3, including a pivoting bearing lever for mounting said bearing means, said lever being subjected to said opposing force generated by said spring means.

5. A machine as defined in claim 4, wherein said lever is pivotable about an axis between the axis of said operating spindle and the axis of said drive shaft.

6. A machine as defined in claim 5, wherein said pivoting axis of said lever is identical with the axis of a resilient torque rod.

7. A machine as defined in claim 5, wherein said pivoting axis of said lever is identical with the axis of a bolt.

8. A machine as defined in claim 1, including a machine housing; said switching means being adjustable relative to said machine housing.

9. A machine as defined in claim 8, including a flexible retainer for securing said switching means; and adjustment means for deflecting and adjusting said flexible retainer in a predetermined direction.

10. A machine as defined in claim 9, wherein said adjustment means comprises a setscrew that is threadable into a thread in said flexible retainer and has one end resting against an area of said housing.

11. A machine as defined in claim 1, wherein said drive shaft comprises a transmission shaft; at least two pinions of different diameters carried on said transmission shaft; an operating spindle; two freely rotating and slidable gears mounted on said operating spindle and having different diameters engaging said pinions correspondingly; one of said gears being coupled to said operating spindle in one limiting position and the other gear being coupled to said operating spindle in another limiting position, said gears being uncoupled from said operating spindle in a substantially mid-position corresponding to an idling position, each of said gears engaging a respective one of said pinions in every position.

12. A machine as defined in claim 11, including at least one transverse pin on said operating spindle and a recess on each slidable gear for bringing each gear into operating relationship; the lateral distance between the two pins exceeding only slightly the combined width of said two gears.

13. A machine as defined in claim 12, wherein one of said gears has a smaller diameter and engages the associated, in particular larger pinion with approximately half its width when in the idling position.

14. A machine as defined in claim 11, including an assembly comprising said motor, said gears and said operating spindle detachably held in an outer housing of said electric tool comprising a screwdriver or sander.

15. A machine as defined in claim 1, including a machine housing with a bore for accommodating said movable bearing means, said bore having a diameter and said bearing means having a width so that the bore diameter exceeds the width of said bearing means by the amount of maximum displacement of said bearing means in switching direction.

16. A machine as defined in claim 15, wherein said bearing means rests against part of the circumference of said bore when in operating position, the axes of said bore and said drive shaft coinciding, an adjacent section of said bearing means being curved to match the radius of said bore; spring means for generating said opposing force, said spring means applying a force directed against the corresponding section of the circumference of said bore.

17. A machine as defined in claim 3, wherein said spring means comprises a stack of cup springs.

18. A machine as defined in claim 17, including a machine housing, said stack of cup springs having an axis extending across, particularly perpendicular, to the direction of motion of said bearing means, said bearing means comprising an arm of an angled lever rotatably mounted in said machine housing; a pressure-application element, said stack of cup springs having an end in the proximity of the lever, said end of said stack resting against another arm of said lever, said stack having an end remote from said lever and associated with said adjustable pressure-application element.

19. A machine as defined in claim 18, wherein said pressure-application element comprises a supporting plate and an arbor extending through said stack of cup springs; an adjustment component for exerting tension on said arbor, said arbor having a free end connected to said adjustment component.

20. A machine as defined in claim 19, including an axially stationary, rotating element with a thread engaging a bolt thread of said arbor, said arbor being movable longitudinally and being fixed against rotation.

21. A machine as defined in claim 20, wherein said rotating element comprises a pinion meshing with a gear on said adjustment component.

22. A machine as defined in claim 3, wherein said spring means comprises a torque rod.

23. A machine as defined in claim 22, wherein said torque rod has a first end secured eccentrically and non-rotatably in said bearing means or a part related thereto; adjustment means rotatable by an adjustment element, said torque rod having a second end secured in said adjustment means, said adjustment element being rotatable and securable at least in steps.

24. A machine as defined in claim 23, including a machine housing; a rotating adjustment cam on said adjustment element, said adjustment means being sleeve-shaped and rotating in said machine housing, said sleeve-shaped adjustment means having mounted on it an arm with a free end resting against said rotating adjustment cam on said adjustment element.

25. A machine as defined in claim 24, wherein said free end of said arm is bent, said adjustment cam being mounted on the circumference of a rotating cam disk, said bent free end of said arm resting against said adjustment cam.

26. A machine as defined in claim 25, wherein said adjustment cam, said adjustment element and said operating spindle have coinciding axes, said torque rod being tensioned independent of rotational operating position of said adjustment cam.

27. A machine as defined in claim 26, wherein said adjustment cam comprises plastic and is secured non-rotatingly to said sleeve-shaped adjustment element, said adjustment element being mounted in front of said housing and overlapping said cam.

28. A machine as defined in claim 27, including an assembly cam positioned directly in front of said adjustment cam in the direction of rotation, said assembly cam having an initial section that is closer to an axis of said assembly cam than an initial section of said adjustment cam.

29. A machine as defined in claim 28, wherein said torque rod extends substantially parallel to said operating spindle, said torque rod having an axis positioned substantially in the middle between an axis of said operating spindle and an axis of said drive shaft.

30. A machine as defined in claim 29, including catch means with a plurality of catch positions distributed in the direction of rotation, said catch means positioned between said adjustment element and said machine housing.

31. A machine as defined in claim 30, wherein said catch means has a spring-loaded ball, a plurality of axially extending grooves being distributd at substantially equal circumferential intervals around the inside of said adjustment element and accommodating said spring-loaded ball.

32. A machine as defined in claim 1, wherein said switching means comprises a tappet of an electric switch having operating contacts.

* * * * *